United States Patent Office 2,728,765
Patented Dec. 27, 1955

2,728,765

PENICILLIN SALTS OF BIS-ARALKYL-ALKENYLENEDIAMINES

Jack Bernstein and Elliot Bartner, New Brunswick, N. J., assignors to Olin Mathieson Chemical Corporation, New York, N. Y., a corporation of Virginia No Drawing. Application December 3, 1953,
Serial No. 396,052

4 Claims. (Cl. 260—239.1)

This invention relates to, and has for its object the provision of: (I) certain novel derivatives of penicillin having advantageous properties for penicillin therapy; (II) certain novel diamines and acid-addition salts thereof, useful as intermediates in the preparation of penicillin derivatives I and for other purposes; and (III) methods of obtaining these diamines and penicillin derivatives.

The diamines of this invention are of the following general formula:

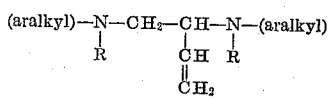

wherein R is a member of the group consisting of hydrogen and aralkyl. (The term "aralkyl" as employed herein, includes both the unsubstituted group and the substituted group, containing one or more substituents, inter alia: alkyl and halogen.) Preferably, R is hydrogen; and preferably also the aralkyl groups in the general formula are benzyl (including benzhydryl) groups.

The penicillin derivatives of this invention are the mono or dipenicillin salts of these diamines. Preferably, the derivatives are the dipenicillin salts of the diamines of the general formula:

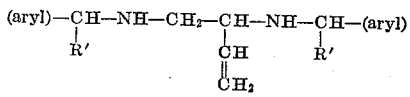

wherein R' is a member of the group consisting of hydrogen, alkyl, aralkyl, and aryl (both the aralkyl and aryl groups may be unsubstituted or may contain one or more substituents: alkyl, alkoxy, halogen, nitro, amino, oxy, and hydroxy). Notably, the dipenicillin salts of N,N'-dibenzhydryl-1,2-diaminobutene-3 and N,N'-dibenzyl-1,2-diaminobutene-3 are advantageous agents for penicillin therapy, being non-toxic, stable (both per se and in aqueous suspension), and having a low solubility in the optimal range for providing prolonged effective blood levels.

The diamines of this invention may be obtained by reaction of a member of the class consisting of: 1,4-dihalobutene-2; 3,4-dihalobutene-1; and mixtures thereof (the halo being preferably chloro) with the amine of the general formula:

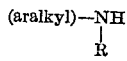

wherein R has a meaning given hereinbefore, and recovering the reaction product.

Utilizable amines include inter alia: benzylamine, 3-chlorobenzylamine, 4-chloro-benzylamine, 4-bromo-benzylamine, 2,4-dichloro-benzylamine, α-phenyl-benzylamine, α-methyl-benzylamine, α-ethyl-benzylamine, α-propyl-benzylamine, α-heptyl-benzylamine, 4-methyl-benzylamine, and dibenzylamine.

The diamines of this invention may be recovered as bases but are more conveniently recovered in the form of their mono or di-acid-addition salts, notably the dihydrochloride.

Salts of the diamines, other than the hydrochloride whose preparation is specifically described hereinafter, may be obtained from the free base by adding the appropriate acid (e. g., hydrobromic, sulfuric, nitric, phosphoric, perchloric, succinic, acetic, malic, tartaric, citric, aminoacetic, salicylic, oxalic, or picric acid) to a solution of the base in an organic solvent such as ether, amyl acetate, butyl acetate, or benzene; these salts being either mono or di-salts depending upon whether 1 or 2 mols of acid are used per mol of the base.

For use in making penicillin salts, the di-salt of the diamines is generally preferred since two mols of penicillin would be combined.

The diamines of this invention are useful as insecticides, and may be used in spray form for combatting various insect (including agricultural) pests. Another utility for these diamines is in forming the penicillin derivatives of this invention for the purpose of separating penicillin from solution and/or purifying the penicillin. Thus, by forming one of the preferred substantially water-insoluble penicillin derivatives, one can almost quantitatively remove penicillin from an aqueous or solvent solution (and purify the penicillin if the solution contains the usual genetic contaminants), and (if desired) convert the substantially water-insoluble penicillin salt of the diamine into a water-soluble penicillin salt (e. g. potassium penicillin).

The penicillin derivatives of this invention may be prepared by the chemical reactions of metathesis or addition. Thus, an alkali salt (e. g. a sodium, potassium, ammonium, or calcium salt) of a penicillin (especially Penicillin G) may be reacted with a mono or di-acid-addition salt of a diamine of this invention in a solvent for the reactants. This reaction can take place in an aqueous solution, but due to the relative insolubility in water of many of the addition salts of the diamines of this invention, the diamine salt is advantageously solubilized in an aqueous organic medium (e. g. aqueous alcohol, aqueous acetic acid, aqueous dimethyl formamide, aqueous formamide, and especially aqueous acetone). One or two molecules of the penicillin will unite with one molecule of the diamine, depending on the use of the mono or the di-salt of the amine.

Alternatively, the penicillin salts of this invention are prepared by a method comprising interacting a free penicillin with a diamine of this invention in a non-aqueous solvent for the reactants (e. g. ether, amyl acetate, ethyl acetate), and recovering the penicillin salt. As in the preparation of the penicillin salt by metathesis, a monopenicillin salt or a di-penicillin salt also results by the addition reaction, depending on the molar ratios of the reactants.

The penicillin derivatives of this invention are used in the treatment of pneumococcal and streptococcal infections. The salts may be formulated for this purpose in various ways, inter alia: tablets, oral suspensions, or other pharmaceutical compositions for oral administration; aqueous and oil compositions for intramuscular administration; and inhalation formulations, such as aerosols. Thus, the dipenicillin salt of N,N'-dibenzhydryl-1,2-diaminobutene-3, for example, may be formulated for prolonged action in an oil depot preparation, if desired, in conjunction with procaine penicillin, and/or with a salt of penicillin G (e. g. potassium penicillin G).

The following is illustrative of other utilizable compositions of the penicillin derivatives of this invention as systemic anti-infectives of prolonged-action, the dipenicillin salt of N,N'-dibenzhydryl-1,2-diaminobutene-3 (for example) being designated as "agent" in the formulations:

A. Agent _____ 150,000 or 300,000 u.
   Procaine penicillin G _____ 150,000 or 300,000 u.
   Aluminum monostearate _____ 20 mg.
   Peanut (or sesame) oil, q. s._ 1 cc.
B. Agent _____ 300,000 or 600,000 u.
   Streptomycin (as base) _____ 250 or 500 mg.
   Dihydrostreptomycin (as base) _____ 250 or 500 mg.
   Water (for injection; containing a dispersing or suspending agent), q. s. _____ 1 cc.
C. Agent _____ 300,000 or 600,000 u.
   Hydrophilic colloid (e. g., sodium carboxymethyl cellulose) _____ 1 to 5 mg.
   Surface-active agent (e. g., Tween 80) _____ 1.25 mg.

Composition C can be supplied for reconstitution with water for injection to total volume of 1 cc.; or the composition can be supplied as a preformed suspension with an aqueous vehicle containing a suitable suspending agent (such as lecithin).

The following is an example of a utilizable oral preparation:

D. Agent _____ 200,000 u.
   Sulfamethazine _____ 0.167 g.
   Sulfamerazine _____ 0.167 g.
   Sulfadiazine _____ 0.167 g.
   Water (for injection, containing a dispersing or suspending agent), q. s. _____ 5 cc.

Other intramuscularly-administrable prolonged-action compositions can be prepared, for example, as taught in U. S. Patent No. 2,637,679, employing one of the preferred penicillin salts of this invention.

The following examples are illustrative, but by no means limitative, of the invention.

EXAMPLE 1

(a) *Preparation of N,N'-dibenzhydryl-1,2-diaminobutene-3 and its dihydrochloride*

A mixture of 91.6 g. benzhydrylamine, 46.2 g. sodium bicarbonate and 125 ml. water is heated on a steam bath at 80–90° C., and 25 g. 1,4-dichlorobutene-2 is added dropwise with vigorous stirring over the course of two hours. The reaction mixture is then refluxed for two hours; and to the cooled reaction mixture is added 500 ml. benzene, and the aqueous layer is saturated with solid sodium hydroxide. The benzene layer separates, and the aqueous layer is extracted with two 200 ml. portions benzene. The benzene extracts are combined and dried over anhydrous potassium carbonate. The benzene is distilled off, and the residue, N,N'-dibenzhydryl-1,2-diaminobutene-3, is distilled under reduced pressure to remove the unreacted benzhydrylamine. (Alternatively, use of a mixture of 1,4-dichlorobutene-2 and 3,4-dichlorobutene-1 in place of 1,4-dichlorobutene-2 in this example, yields N,N'-dibenzhydryl-1,2-diaminobutene-3).

The residue is dissolved in 500 ml. anhydrous ether, and ethereal hydrogen chloride is added dropwise with stirring and cooling. The dihydrochloride of N,N'-dibenzhydryl-1,2-diaminobutene-3 precipitates and is filtered off. It melts at about 264–266° C., with decomposition; and on crystallization from methanol and ether mixture, the salt melts at about 273–274° C., with decomposition. (Alternatively, the residue is taken up in a little ether, glacial acetic acid added in sufficient amount to form the diacetate, and the solid recrystallized).

Infra-red analysis indicates that the use of 3,4-dichlorobutene-1, in place of 1,4-dichlorobutene-2 in this example (the residue being dissolved in dimethylformamide instead of benzene, and the aqueous phase extracted with ether) yields the same diamine product, designated hereinbefore as N,N'-dibenzhydryl-1,2-diaminobutene-3; and the dihydrochloride prepared from this base (derived from the 3,4 compound) shows no depression in a mixed melting point test with the dihydrochloride derived from the 1,4 compound.

(b) *Preparation of the di-penicillin salt of N,N'-dibenzhydryl-1,2-diaminobutene-3*

A solution of 10.0 g. N,N'-dibenzhydryl-1,2-diaminobutene-3 dihydrochloride in 250 ml. 60% aqueous acetone is added rapidly to a stirred solution of 17.0 g. potassium penicillin in 200 cc. of 2% sodium citrate solution. After continuous stirring for two hours, the mixture is refrigerated overnight, and the product (the di-penicillin salt) is isolated by filtration, washed thoroughly with water and dried in vacuo. Yield about 93%. The product, a white crystalline powder, melts at about 128–130° C., and assays about 1090 u./mg. Calculated for N: 7.74%; found: 7.79%.

(Alternatively, aqueous alcohol or aqueous dimethyl formamide are used in place of aqueous acetone.)

(c) *Alternative preparation of the di-penicillin salt*

10 g. N,N'-dibenzhydryl-1,2-diaminobutene-3 dihydrochloride in 250 ml. 60% aqueous acetone is treated with 100 ml. ether, followed by 6N sodium hydroxide to pH=10. The ether layer is separated and the aqueous layer extracted with 2 x 60 ml. portions of ether. The combined ether extracts are washed with 100 ml. water and dried over sodium sulfate in the refrigerator.

A cold solution of 17 g. potassium penicillin in 200 ml. 0.5% sodium citrate solution is treated with 150 ml. ether. 10% phosphoric acid is added, with stirring, to pH=2.5. The ether layer is separated and the aqueous layer extracted with 2 x 50 ml. portions of ether. The combined ether extracts are washed with 100 ml. water and dried over sodium sulfate in the refrigerator.

Each ethereal solution is decanted from the drying agent through glass wool. The base solution is added to the penicillin solution with shaking. After a few minutes, precipitation commences. After one hour refrigeration, the white solid, the di-penicillin salt of N,N'-dibenzhydryl-1,2-diaminobutene-3, is filtered, washed thoroughly with ether, and dried.

Using a molar equivalent of 4,4'-dichlorobenzhydrylamine in place of benzhydrylamine in Example 1, yields the di-penicillin salt of N,N'-[bis-(4,4'-dichlorobenzhydryl)]-1,2-diaminobutene-3.

EXAMPLE 2

(a) *Preparation of N,N'-dibenzyl-1,2-diaminobutene-3 and its dihydrochloride*

To a mixture of 178.5 g. benzylamine and 18 g. water maintained between 15 and 20° C. there is added dropwise (two hours) 41.7 g. 1,4-dichlorobutene-2, with stirring. The cooling bath is then removed (the temperature gradually rises to 75° C.), and the heating is maintained with stirring for an additional 2.5 hours. The reaction mixture is allowed to stand for 12–16 hours, and then stirred for fifteen minutes with a solution of 40 g. sodium hydroxide in 150 ml. water. The organic layer is separated, washed with 250 ml. water, and dried over anhydrous potassium carbonate. The drying agent is then removed by filtration, and washed with several small portions of absolute alcohol which are combined with the organic layer. The alcohol and excess benzylamine are removed by distillation under reduced pressure, yielding about 52.9 g. of the free base, N,N'-dibenzyl-1,2-diaminobutene-3.

To 47.6 g. of said base in 300 ml. anhydrous ether there is added an equivalent quantity of an ether solution of hydrogen chloride (approx. 4.5 N) in small portions, with stirring and cooling on an ice bath until the reaction mixture is acid to moistened Congo red paper. The insoluble product is filtered off, washed with three 120 ml. portions anhydrous ether, and after drying for two hours under reduced pressure, is recrystallized from 1200 ml. methanol. After the first crop is filtered off, the filtrate is concentrated; and the resulting second crop is combined with the first. A second recrystallization from 1250 ml. 93% ethanol carried out in the same way yields about 22 g. of product, the dihydrochloride of N,N'-dibenzyl-1,2-diaminobutene-3, melting at about 294.5–295° C. (dec.). Upon a third recrystallization from 900 ml. 90% ethanol, the M. P. remains constant; yield about 15.6 g.

Alternatively, the diacetate is prepared from the free base, N,N'-dibenzyl-1,2-diaminobutene-3, in ether by the addition of glacial acetic acid.

Use of a molar equivalent of 3,4-dichlorobutene-1 or a mixture of 3,4-dichlorobutene-1 and 1,4-dichlorobutene-2 in place of 1,4-dichlorobutene-2 in Example 2, yields N,N'-dibenzhydryl-1,2-diaminobutene-3.

(b) *Preparation of the di-penicillin salt of N,N'-dibenzyl-1,2-diaminobutene-3*

339 mg. N,N'-dibenzyl-1,2-diaminobutene-3 dihydrochloride is dissolved in 4 ml. water, and the solution is added to 2 ml. 40% buffered potassium penicillin. A white solid forms immediately, is filtered, washed thoroughly with water and dried in vacuo. The product, the di-penicillin salt of N,N'-dibenzyl-1,2-diaminobutene-3, melts at about 125–126° C., and assays about 1185 units/mg. Calculated for N: 8.78%; found: 8.94%.

EXAMPLE 3

(a) *Preparation of N,N'-bis-(α-methylbenzyl)-1,2-diaminobutene-3 and its dihydrochloride*

12.5 g. 1,4-dichlorobutene-2 is added to 60.5 g. α-methyl-benzylamine in 18 ml. water at room temperature. The mixture is heated on a steam bath for 2½ hours, the temperature of the mixture remaining at 85–90° C. throughout the heating. After cooling to room temperature, 12.0 g. NaOH in 40 ml. water is added with stirring to the mixture. An organic layer separates, and the alkaline-water layer drawn off. The organic layer is taken up in 50 ml. ether and washed twice with small portions of water. The ether solution is dried over anhydrous potassium carbonate. After filtration, the ether is distilled off and the residue fractionated. The first fraction boils at 65–134° C./2 mm. (mostly 65–75° C./2 mm.); and the second fraction boils at 210–215° C./1 mm. The second fraction is dissolved in absolute alcohol (30 ml.), and to this solution is added a solution of an equivalent quantity of ethanolic HCl. The resulting precipitate is filtered and washed with ether. The material (about 20 g. undried weight) is recrystallized from a mixture of 250 ml. methyl alcohol and 180 ml. ether. The yield is about 10 g.; M. P. about 10 g.; M. P. about 293° C. (dec.).

Using a molar equivalent of α-amyl-benzylamine in place of α-methyl-benzylamine in Example 3, yields N,N'-bis-(α-amylbenzyl)-1,2-diaminobutene-3 and its dihydrochloride.

EXAMPLE 4

*Preparation of N,N,N',N'-tetrabenzyl-1,2-diaminobutene-3*

To a well-stirred mixture of 98.6 g. dibenzylamine, 46.2 g. sodium bicarbonate, and 125 ml. of water maintained at 85–90° C. on a steam bath is added dropwise (two hours) 27.5 g. 1,4-dichlorobutene-2. After refluxing an additional two and one-half hours, the reaction mixture is cooled in an ice bath and saturated with solid sodium hydroxide. It is then allowed to stand overnight at 5° C., the aqueous phase decanted, and the semi-crystalline residue triturated with several changes of ice water. The oily slurry is then transferred to a Buchner funnel, washed with several additional portions of water and finally with 50 ml. portions (five) of cold alcohol until colorless. The product, melting at 109–110.5° C., weighs about 66.7 g. Recrystallized from isopropanol, the yield is about 64.1 g.; M. P. about 113–114° C. (The latter product recrystallized a second time from 950 ml. of isopropanol, weighs about 62.4 g.; M. P. about 113–114° C.)

The free base, N,N,N',N'-tetrabenzyl-1,2-diaminobutene-3, and free penicillin in ether yield the di-penicillin derivative of N,N,N',N'-tetrabenzyl-1,2-diaminobutene-3.

EXAMPLE 5

(a) *Preparation of N,N'-bis-(p-chlorobenzyl)-1,2-diaminobutene-3 and its dihydrochloride, hydrate*

To a well stirred mixture of 99.1 g. of p-chlorobenzylamine and 25 ml. of water maintained at 20° C. with an ice bath is added dropwise (1 hr.) 17.5 g. of 1,4-dichlorobutene-2. The ice bath is removed and when the reaction subsides, the temperature is raised to 50° C. and stirring continued for about two hours. The reaction mixture is then cooled, the hydrochloride formed is decomposed with an excess of 40% potassium hydroxide, and the mixture of liberated bases is extracted with three 150 ml. portions of ether. The combined extracts are dried over magnesium sulfate and freed of ether by distillation on a steam bath and from excess p-chlorobenzylamine at reduced pressure (2.5 mm.). The residue, N,N'-bis-(p-chlorobenzyl)-1,2-diaminobutene-3, is dissolved in 20 ml. of anhydrous ether and filtered from a small quantity of insoluble material and again evaporated to dryness.

To a solution of 31.9 g. of the free base in 600 ml. of anhydrous ether cooled in an ice bath is added with vigorous stirring ethereal hydrogen chloride, in small portions until the solvent is acid to moistened Congo red paper. The product melts at about 256° C. (with decomposition), and weighs about 35.8 g. After reprecipitation from 1000 ml. of methanol with excess anhydrous ether, the M. P. is about 264° C. (with decomposition).

20.3 g. of the compound are reprecipitated from 1750 ml. of 95% alcohol, after the solution has been made acid to moistened Congo red paper by dropwise addition of ethereal hydrogen chloride with an excess of anhydrous ether; melting at about 291° C. (with decomposition).

(b) *Preparation of the di-penicillin salt of N,N'-bis-(p-chlorobenzyl)-1,2-diaminobutene-3*

To a solution of 426 mg. of N,N'-bis-(p-chlorobenzyl)-1,2-diaminobutene-3 dihydrochloride, hydrate in 70 cc. water is added a solution of 744 mg. of potassium penicillin in 20 cc. water; an oily precipitate forms which crystallizes on standing several hours. The solid is filtered and weighs about 500 mg., M. P. about 115–119° C. (with decomposition). The solid has a potency of 1016 u./mg.

The invention may be variously otherwise embodied within the scope of the appended claims.

We claim:
1. A penicillin salt of N,N'-dibenzhydryl-1,2-diaminobutene-3.
2. A penicillin salt of N,N'-dibenzyl-1,2-diaminobutene-3.
3. A penicillin salt of a diamine of the general formula

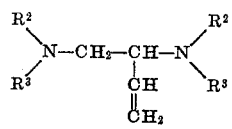

wherein

is a member of the class consisting of —NH-(benzyl),
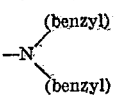
—NH-(benzhydryl), —NH-(halobenzyl), and —NH-α-(lower alkyl)-benzyl.
4. A penicillin salt of N,N'-bis-(p-chlorobenzyl)-1,2-diaminobutene-3.
References Cited in the file of this patent
UNITED STATES PATENTS
| | | |
|---|---|---|
| 2,334,782 | Martin | Nov. 23, 1943 |
| 2,525,777 | de Benneville | Oct. 17, 1950 |
| 2,540,938 | Finch et al. | Feb. 6, 1951 |
| 2,627,491 | Szabo et al. | Feb. 3, 1953 |
| 2,640,080 | De Tar | May 26, 1953 |